July 16, 1946.　　　　R. PLACE　　　　2,404,189
MICROFILM PROJECTOR
Filed Sept. 24, 1942　　　3 Sheets-Sheet 1
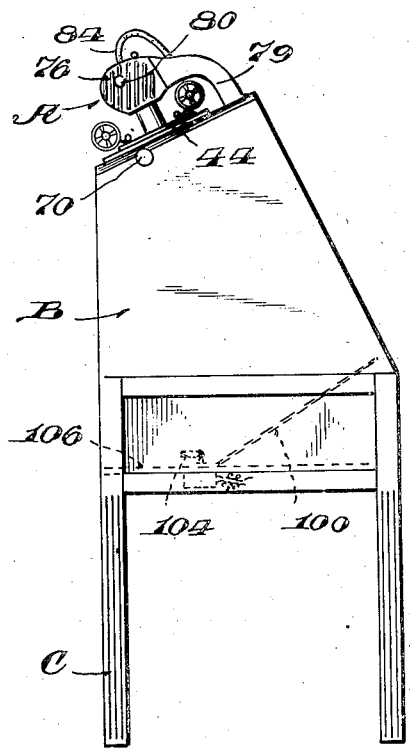
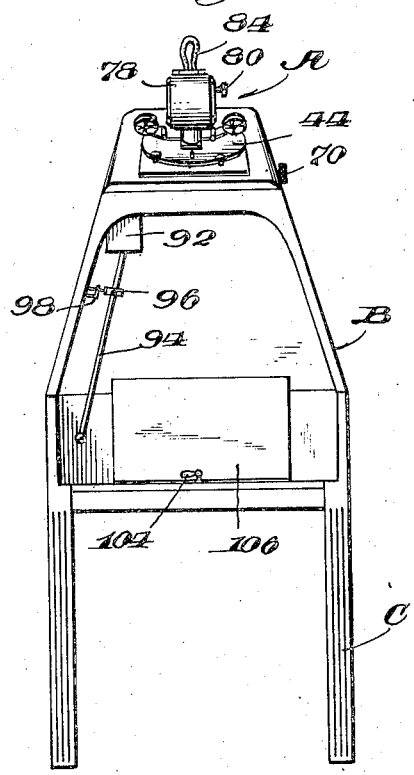
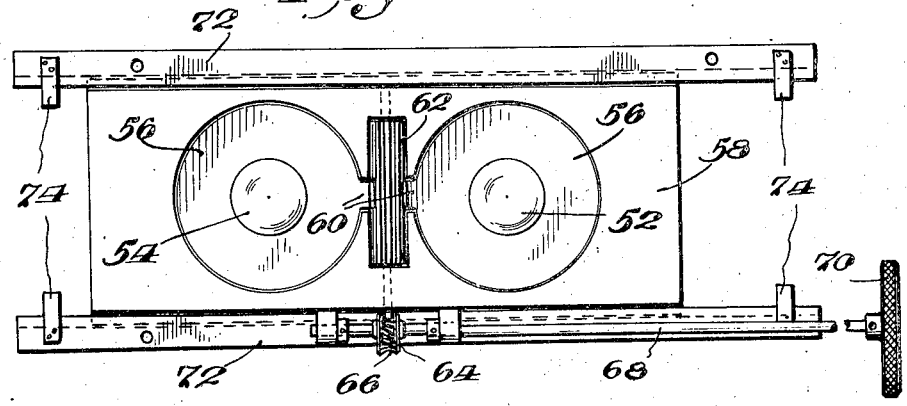
Inventor
Robert Place,
By
Attorney

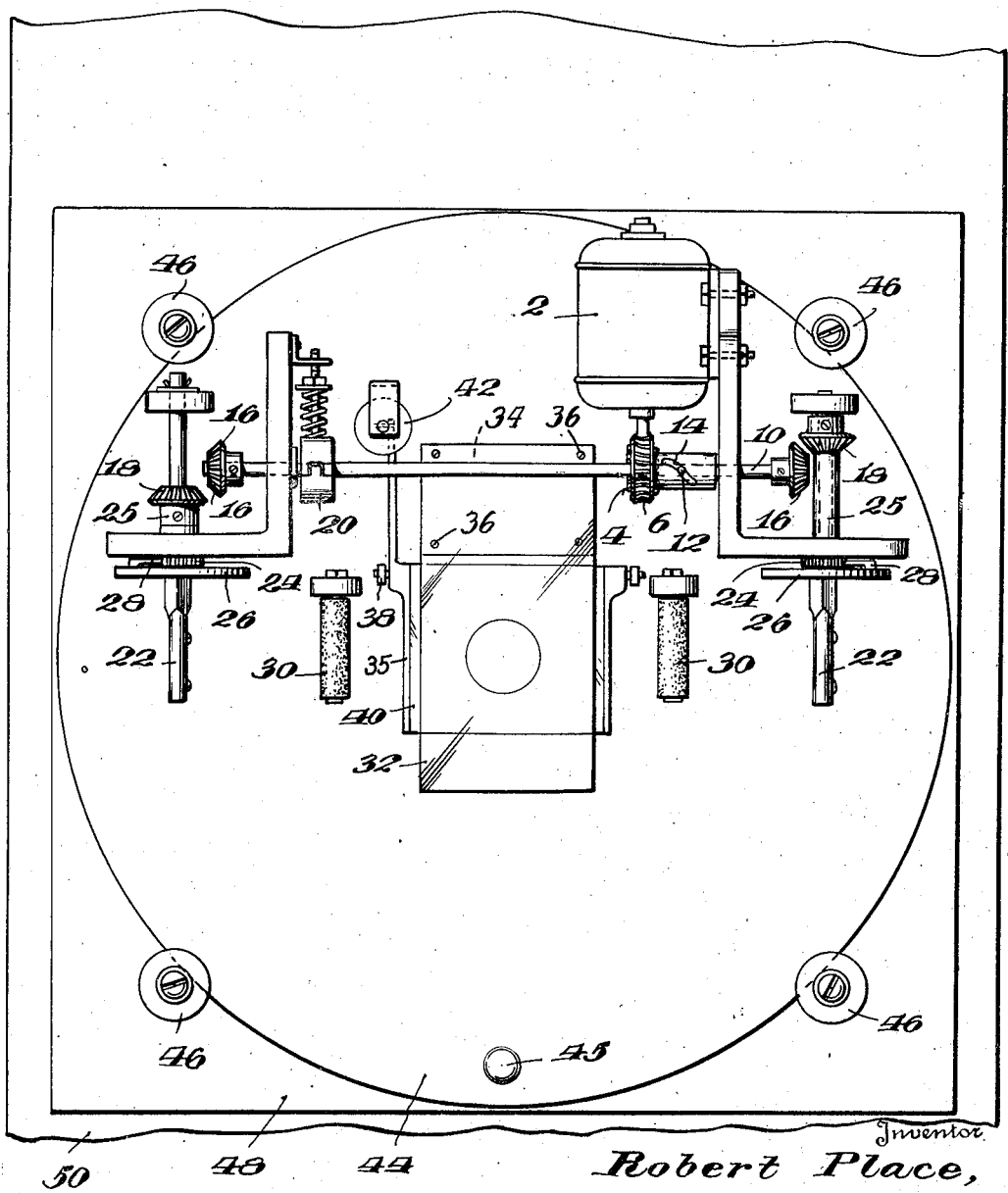

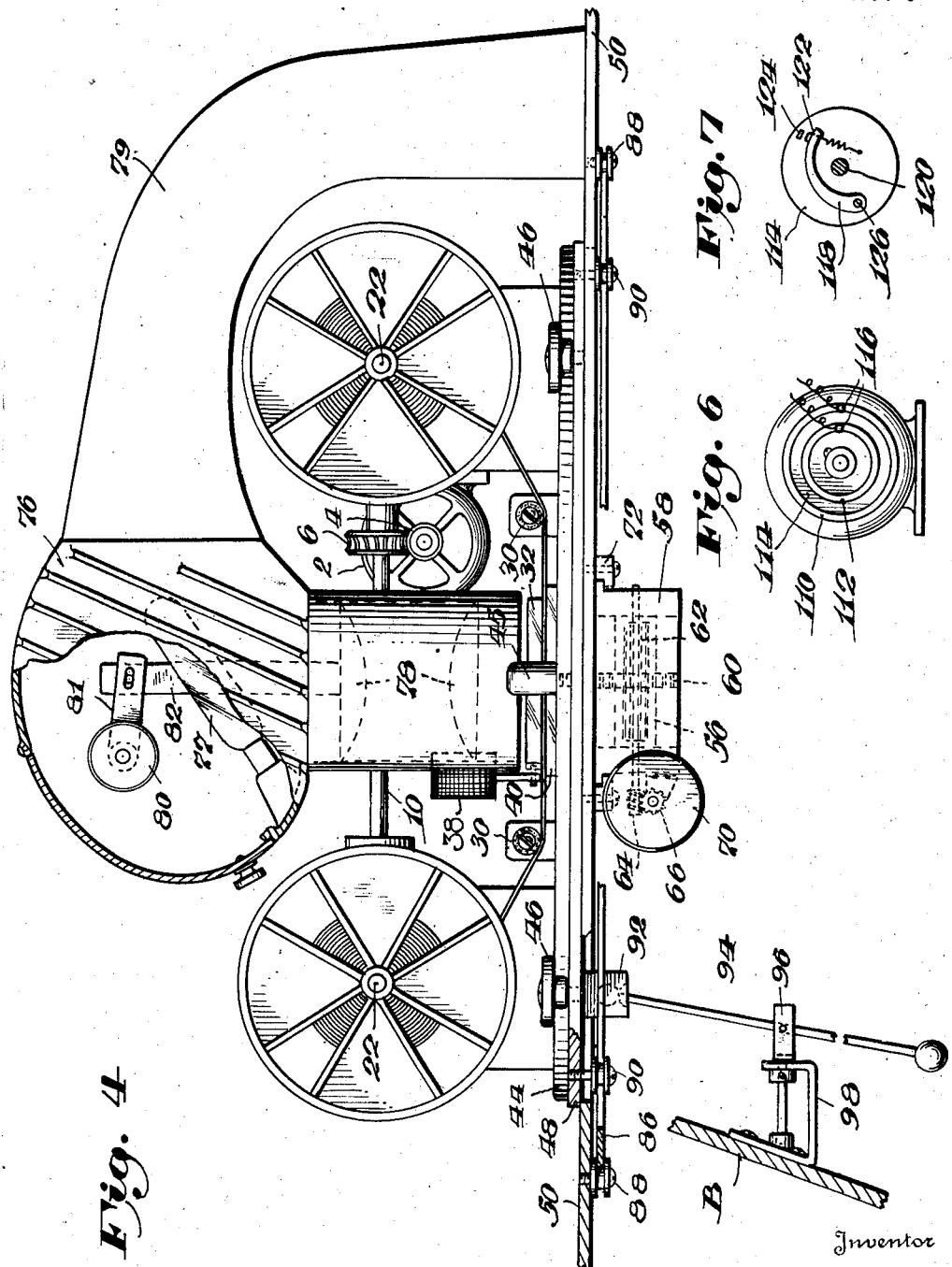

Patented July 16, 1946

2,404,189

UNITED STATES PATENT OFFICE 2,404,189

MICROFILM PROJECTOR

Robert Place, Waltham, Mass., assignor to Graphic Microfilm Service, Inc., Waltham, Mass., a corporation of Massachusetts Application September 24, 1942, Serial No. 459,565

6 Claims. (Cl. 88—24)

This invention relates to improvements in microfilm projectors or reading machines. While the improvements of the present invention are applicable to any type of projector they are particularly adapted for use in connection with and will be herein described as embodied in a direct projection machine.

An object of the invention is to provide an electrically driven machine extremely simple in construction and characterized by the utmost ease in manipulation.

Another object is to provide a projection device wherein tearing or other damage to the film is minimized and in this regard the invention specifically contemplates the provision of means to delay closing of the film gate until rotation of the armature ceases following deenergization of the film drive motor.

It is a further object of the invention to provide a projection device capable of imparting various magnifications to the projected image and which may be readily operated to scan or enlarge any desired part of the projected image.

Other objects and advantages will be apparent from the following description taken in conjunction with the accompanying drawings wherein a preferred embodiment of the invention has been selected for exemplification.

In the drawings:

Fig. 1 is a side elevational view of a reading machine cabinet according to the present invention;

Fig. 2 is a front elevational view of the device of Fig. 1;

Fig. 3 is a plan view of the projector apparatus;

Fig. 4 is a side elevational view of Fig. 3;

Fig. 5 is a plan view of the sliding lens structure; and

Figs. 6 and 7 are front and rear views respectively of a circuit breaker associated with the electric motor.

Referring more particularly to the drawings wherein like numerals refer to like parts, the reading machine of Figs. 1 and 2 is composed of projector apparatus indicated in its entirety at A, and a shadow box B suitably supported by legs or the like C.

The projector apparatus A is driven by a reversible electric motor 2 driving a worm 4 meshing with a worm gear drive 6 which in turn drives a cross drive shaft 10 suitably supported for reciprocal movement. The drive to shaft 10 is through a sleeve 8 directly attached to worm gear 6 and diagonally slotted as at 14 to receive a pin 12 carried by the shaft 10. Bevel gears 16 are keyed to the free ends of shaft 10 and disposed to mesh alternately with bevel gears 18 which drive film reel supporting spindles 22.

It will be apparent that as worm gear 6 revolves the pin 12 will be urged to one extremity or the other of the diagonal slot 14, thus to force shaft 12 to slide its full length of movement in one direction to mesh one set of bevel gears 16 and 18 and disengage the other set and reverse drive of worm gear 6 from the motor 2 will urge the pin 12 to the opposite extremity of the diagonal slot 14 thus sliding shaft 10 so that the other set of bevel gears 16 and 18 will operatively mesh and the first set will be disengaged. A braking assembly indicated at 20 is provided to retard the action of shaft 10 forcing it to slide back and forth.

Spindles 22 are preferably indirectly connected to bevel gears 18 by the medium of ratchets 24 attached directly to gears 18 by a sleeve 25. Cooperating with ratchets 24 are spring held pawls 28 supported by flanges 26 which are fixed to spindles 22 in such a manner that overrunning of the spindles 22 is permitted to facilitate loading of the projector while one pair of gears 16 and 18 is engaged.

The film carried by the film reel supported on the spindles 22 passes under rollers 30 and between a pair of glass pressure plates, the upper one being designated at 32 and secured in position on a plate hereinafter referred to and designated by the numeral 44. A suitable boss 34 carried by said plate is of the proper height to fixedly position the lower surface of the plate 32 in the focal plane of the objective lens of the projector. The plate 32 is secured on the base 34 by means of screws 36. The lower glass 40 is supported directly below the plate 32 in a movable frame 35 fulcrumed at 38 and actuated by a solenoid 42. The solenoid 42 is connected through reversible motor 2 to a common control as will hereinafter appear and the arrangement is such that the glass plates 32 and 40 are separated at all times while the film is moved between them.

Since the armature of electric motor 2 will continue to rotate a short while after deenergization of the motor, it has been found advisable to appropriately delay deenergization of the film gate actuating solenoid 42 until such rotation ceases and the film comes substantially to rest to prevent tearing or scratching of the film as would result from abruptly clamping a moving film in the gate. A suitable mechanism for this purpose is a centrifugal circuit breaker as best shown in Figs. 6 and 7. Herein a disc 114 of non-conducting material is keyed to rotate with the motor shaft and carries on its front or outer face concentric conductor rings 110 and 112 which conduct current through brushes 116 to the film gate actuating solenoid 42. Pivotally mounted on pin 126 extending from ring 112 to the rear or inner face of disc 114 is a dog 118 held against pin abutment 120 by a weak spring 122. The relative strength of spring 122 and weight of dog 118 is such that any rotation of the motor shaft and disc 114 causes the dog to swing outwardly into engagement with contact 124 to complete the circuit to solenoid 42 whereby the solenoid is energized and the film gate pressure plates remain open so long as the motor shaft rotates irrespective of the moment of deenergization of the motor.

The film supporting and advancing mechanism and glass plate construction above described and as shown in Fig. 3 are mounted on disc 44 which revolves 360° on the support of rollers 46 preferably four in number and which may be rotated by a knob or the like 45. Rollers 46 are fixedly mounted on a panel 48 which is mounted as hereinafter described on the main support frame 50 of the shadow box B so that the image on the film may be rotated in any position or may be skimmed so as to bring any portion of the film frame to the center of the reading screen.

The means by which variable magnification is preferably accomplished is best shown in Fig. 5 wherein lenses 52 and 54 of different focal lengths are carried by sliding lens mounts 56 supported in block 58. Small gear racks 60 are attached to the slidable lens mounts 56 and engage a pinion 62 fixed to worm gear 64. Gear 64 is driven by an engaging worm 66 carried by a slidable and rotatable control shaft 68 which extends through the cabinet housing B and has a knob or handle 70 keyed to the projecting end thereof. Block 58 is slidably supported in channel 72 carried by the fixed plate 50 and abutments 74 are provided to limit the sliding movement of the block in the channels.

It will be apparent that by pulling or pushing control knob 70 and axially moving shaft 68, the block 58 will be shifted to locate either lens 52 or 54 in the optical path to give a magnification in accordance with the focal length of the lens selected and that by turning the knob 70 to rotate shaft 68 and the gear train connecting with lens mounts 56, the selected lens may be positioned for a critical focus.

As best illustrated in Fig. 4, the lamp house 76 and condenser system 78 are supported by an arm 79 attached to stationary plate 50. As a further feature of the invention and which provides for varying the focal cone of the condenser system, the bottom condenser 78 is movable and may be raised or lowered by turning knob 80 which actuates arms 81 and 82. This construction is sometimes desirable where the lenses 52 and 54 are varied, as for example, a two inch lens and a one inch lens, and by adjusting the position of the condenser system 78 the maximum lighting efficiency can be provided for the different lenses.

A wire bound flexible cable 84 is preferably provided for furnishing the conductor support for the power lines to the motor 2 and solenoid 42 which, as explained above, are carried by plate 44.

The supporting plate 44 may be shifted in order that the image may be skimmed or any part thereof projected to the center of the viewing screen through the medium of panel 48 carrying the rollers 46 engaging spaced portions of the plate periphery. Panel 48 carries rollers 90 and is in turn supported by engagement of the rollers 90 in slots provided in a frame 86. Opposed edges of frame 86 are slidably supported by rollers 88 carried by fixed panel 50 which forms the top of the shadow box. The arrangement is such that panel 48 is movable with frame 86 in one direction and movable relative to frame 86 in a transverse direction of the same plane thus to shift disc 44 and the image producing means supported thereon into any desired planar position.

As a control means for the above, a block 92 carried by movable panel 48 extends through a slot in fixed plate 50 to provide a socket for rod 94 which is universally swiveled through a swivel assembly indicated at 96 bracketed as at 98 to the inner wall of the shadow box B. The rod 94 extends downwardly terminating near the reading screen 100 to be readily accessible to the reader or user of the device for skimming any portion of the image frame to the center of the screen.

Main control switch 104 is conveniently positioned on the floor of the shadow box in front of the screen 100, the control switch of course connecting with the conductors passing through the flexible cable 84 and furnishing current to the electric motor 2 and solenoid 42 whereby to substantially simultaneously actuate the same so that the glass plates 32 and 40 will be opened when the film is advanced.

In the projection assembly shown in Figs. 1 and 2 it will be apparent that the screen 100 is mounted at a tilted angle parallel to the fixed plate 50 upon which the projection apparatus is mounted for direct projection but it will be understood any other suitable direct or indirect projection arrangement may be employed if desired. It is apparent also that the forward part of the floor of the shadow box B, which is indicated at 106, may conveniently be employed as a writing shelf.

What I claim is:

1. In a reading machine in combination, a film supporting and advancing means, projection mechanism, separable plates forming a film gate, an electric motor for driving said film advancing means, solenoid means including a magnetically actuated member operatively connected to at least one of said plates, an electric circuit between said motor and a source of current, and a second circuit between said solenoid and said source, said last circuit including circuit closing means driven by said motor, said circuit closing means being normally open when said motor is at rest and adapted to close instantly when moved in either direction, thereby holding said gate open during the time said film is in motion, and closing it only while the film is at rest.

2. In a reading machine in combination, film supporting and advancing means, projection mechanism, a film gate formed of separable plates, centrifugally controlled contact means, an electric motor directly connected to said contact means and connected to said film advancing means through reversible reduction gearing, electro-magnetic means including a movable member operatively connected to at least one of said plates, an electric circuit between said motor and a source of current, and a second circuit connected to said source, said electro-magnetic means, and said centrifugally controlled contact means, said contact means being normally open when said advancing means is at rest and adapted to close instantly when said advancing means is moved by said motor in either direction, thereby energizing said magnetic means and holding said gate open when said film is in motion and closing it only while said advancing means is at rest.

3. In a reading machine in combination, film supporting and advancing means, projection mechanism, a film gate formed of a pair of plates in contact with each other, one of said plates being movable, an electric motor connected to reversible reduction gearing for driving said advancing means in either direction, centrifugally controlled contact means carried directly on the rotor of said motor, electro-magnetic means including a movable member operatively connected to said movable plate, an electric circuit between said motor and a source of current, and a second circuit connected to said source, said electromagnetic means and to said centrifugally controlled contact means, said last circuit being normally open when said motor is at rest, and adapted to close instantly when said motor is energized, thereby energizing said magnetic means and holding said gate open, and adapted to continue to energize said magnetic means after said motor is deprived of current and decelerates substantially to a stop.

4. In a reading machine in combination, film supporting and advancing means, projection mechanism, a film gate formed of a stationary plate, and a pivoted movable plate in contact therewith, an electric motor for driving said advancing means in either direction through reversible reduction gearing, normally open centrifugally controlled contact means carried on the rotor of said motor and adapted to close substantially instantly when said rotor starts moving, a solenoid having a movable member operatively connected to said pivoted plate, an electric circuit between said motor and source of current, a second circuit connected to said source and including said solenoid and said centrifugally controlled contact means, said second circuit being adapted to close and thereby open said film gate as current is supplied to said motor and it starts rotating, said second circuit being adapted to continue to receive energy after said motor is deenergized and until said rotor comes to rest, thereby effecting the closure of said film gate only while said motor is at rest.

5. In a reading machine in combination, a cabinet, film handling and projection mechanism positioned at the top of the cabinet, a viewing screen positioned in the lower portion of said cabinet, and having its mid portion cut by the optical axis of said projection mechanism, a rectangular frame at right angles to and cutting said optical axis and adapted to be positively stopped at two positions spaced apart from each other, a pair of lenses mounted in said frame in spaced relation to each other one of them being in alignment with the optical axis when said frame is in one position and the other being adapted to be brought into alignment with the optical axis when said frame is in the other position, and a shaft operable from the exterior of the cabinet and connected to said frame, said shaft being movable axially to position said lenses as aforesaid and rotatable to focally adjust a selected lens with respect to said projection mechanism.

6. In a reading machine in combination, film supporting and advancing means, projection mechanism, a film gate formed of a rigidly supported plate and a pivoted plate cooperating therewith, an electric motor connected to said film advancing means through reduction gearing and adapted to drive said advancing means in either direction, centrifugally controlled contact means including a rotary member on the armature of said motor, collector rings on said armature, and stationary brushes on the frame of said motor, a solenoid having a movable member operatively connected to said pivoted plate for moving it out of contact with said stationary plate while said solenoid is energized, the ratio of said reduction gear furnishing the time delay between the opening of said gate and the movement of said film, a circuit between said motor and a source of current, and a second circuit connecting said source to said centrifugally controlled contact means and said solenoid.

ROBERT PLACE.